US009520708B2

(12) United States Patent
Moriuchi (10) Patent No.: US 9,520,708 B2
(45) Date of Patent: Dec. 13, 2016

(54) PROTECTION CIRCUIT, INTERFACE CIRCUIT, AND COMMUNICATION SYSTEM (71) Applicant: SOCIONEXT INC., Yokohama-shi, Kanagawa (JP)

(72) Inventor: Tunehiko Moriuchi, Toyoake (JP)

(73) Assignee: SOCIONEXT INC., Yokohama (JP)

( * ) Notice: Subject to any disclaimer, the term of this patent is extended or adjusted under 35 U.S.C. 154(b) by 325 days.

(21) Appl. No.: 14/025,510

(22) Filed: Sep. 12, 2013

(65) Prior Publication Data
US 2014/0092509 A1 Apr. 3, 2014

(30) Foreign Application Priority Data

Sep. 28, 2012 (JP) ................................. 2012-216869

(51) Int. Cl.
*H02H 3/20* (2006.01)
*H02H 9/04* (2006.01)
(52) U.S. Cl.
CPC ............... *H02H 3/20* (2013.01); *H02H 9/046* (2013.01)
(58) Field of Classification Search
USPC .......................................... 361/56, 91.1, 111
See application file for complete search history.

(56) References Cited

U.S. PATENT DOCUMENTS

| 5,942,921 | A | * | 8/1999 | Talaga, Jr. | ........... | H03K 5/2481 |
| | | | | | | 326/115 |
| 6,441,733 | B1 | * | 8/2002 | Unterschultz | .......... | G08B 29/08 |
| | | | | | | 340/540 |
| 6,507,469 | B2 | | 1/2003 | Andoh | | |
| 7,359,171 | B2 | | 4/2008 | Yoshida | | |
| 7,551,098 | B1 | * | 6/2009 | Chock | .................... | G08B 29/08 |
| | | | | | | 174/50 |
| 2003/0141989 | A1 | * | 7/2003 | Arisawa | ............. | G06K 7/10237 |
| | | | | | | 340/870.01 |

(Continued)

FOREIGN PATENT DOCUMENTS

CN   101552605 A   10/2009
CN   101789586 A   7/2010
(Continued)

OTHER PUBLICATIONS

Chinese Office Action issued Feb. 17, 2015; Chinese Application No. 201310447491.X.

*Primary Examiner* — Thienvu Tran
*Assistant Examiner* — Angela Brooks
(74) *Attorney, Agent, or Firm* — Arent Fox LLP (57) ABSTRACT

A protection circuit includes a control circuit coupled to a first power-supply wire applied with a first power-supply voltage. The control circuit generates a control voltage in accordance with the first power-supply voltage and an input voltage. A voltage limitation circuit is coupled between a first node applied with the input voltage and a second power-supply wire applied with a second power-supply voltage. The voltage limitation circuit includes a variable resistance unit having a resistance value that changes according to the control voltage. When the first power-supply voltage is not supplied to the protection circuit and the input voltage is larger than a first voltage, the control circuit generates the control voltage such that the resistance value of the variable resistance unit is smaller than that in a case where the input voltage is equal to or less than the first voltage.

7 Claims, 6 Drawing Sheets

(56) References Cited

U.S. PATENT DOCUMENTS

| | | | | |
|---|---|---|---|---|
| 2003/0184568 A1* | 10/2003 | Date | ................... | G09G 3/3685 |
| | | | | 345/690 |
| 2005/0052924 A1* | 3/2005 | Nishizawa | ........... | G06K 19/077 |
| | | | | 713/310 |
| 2007/0206338 A1* | 9/2007 | Ishino | ................... | G05F 1/575 |
| | | | | 361/93.9 |
| 2010/0321841 A1* | 12/2010 | Worley | ................. | H02H 9/046 |
| | | | | 361/56 |
| 2011/0267723 A1* | 11/2011 | Stockinger | .......... | H01L 27/0292 |
| | | | | 361/56 |
| 2012/0013590 A1* | 1/2012 | Minami | ............... | G09G 3/3225 |
| | | | | 345/211 |
| 2012/0038389 A1* | 2/2012 | Chiang | ............... | G06K 7/0008 |
| | | | | 326/62 |
| 2013/0208385 A1* | 8/2013 | Salcedo | ................. | H01L 23/60 |
| | | | | 361/111 |
| 2013/0238910 A1* | 9/2013 | Liu | ..................... | H03K 17/693 |
| | | | | 713/300 |
| 2013/0342943 A1 | 12/2013 | Yuuki et al. | | |
| 2014/0204488 A1* | 7/2014 | Worley | ................. | H02H 9/046 |
| | | | | 361/56 |
| 2015/0214742 A1* | 7/2015 | Yu | .......................... | H02J 1/102 |
| | | | | 307/86 |

FOREIGN PATENT DOCUMENTS

| | | |
|---|---|---|
| JP | S58-57823 A | 4/1983 |
| JP | 09-199609 A | 7/1997 |
| JP | 11-051980 A | 2/1999 |
| JP | 2001-358297 A | 12/2001 |
| JP | 2004-080346 A | 3/2004 |
| WO | WO-2012/114392 A1 | 8/2012 |

* cited by examiner

PROTECTION CIRCUIT, INTERFACE CIRCUIT, AND COMMUNICATION SYSTEM

CROSS-REFERENCE TO RELATED APPLICATIONS

This application is based upon and claims the benefit of priority from prior Japanese Patent Application No. 2012-216869, filed on Sep. 28, 2012, the entire contents of which are incorporated herein by reference.

FIELD

This disclosure relates to a protection circuit, an interface circuit, and a communication system.

BACKGROUND

In general, semiconductor devices are used to realize system functions. The semiconductor devices each have interface circuits (input circuit, output circuit, and/or input/output circuit) and communicate with each other via the interface circuits to provide system functions. One or more of the semiconductor devices may be auxiliary device(s) detachably provided to the system.

Each of the semiconductor devices has a terminal (external terminal) for coupling with another semiconductor device. A voltage higher than a power-supply voltage in the semiconductor device, for example, ESD (electrostatic discharge) or the like, may be applied to the external terminal. The high voltage may deteriorate characteristics of elements such as transistors in the semiconductor device. Japanese Laid-Open Patent Publications No. 11-51980 and No. 2004-80346 each describe a protection circuit that is provided in interface circuits in accordance with factors for deterioration.

When no power-supply voltage is supplied to an interface circuit, a voltage higher than a power-supply voltage, for example, may be applied to the terminal (external terminal) of the interface circuit. For example, a memory card used for a digital camera is inserted into a slot of the digital camera and operated on the basis of a power-supply voltage supplied from the digital camera. In such a system, when no power-supply voltage is supplied to the interface circuit of the memory card, a voltage higher than the power-supply voltage may be applied to the external terminal of the memory card. In this case, since the protection circuit does not work effectively, the high voltage may be applied to a circuit to be protected (e.g., an input buffer) via the external terminal. This may break the circuit.

SUMMARY

One aspect of this disclosure is a protection circuit. The protection circuit includes a control circuit coupled to a first power-supply wire applied with a first power-supply voltage. The control circuit generates a control voltage in accordance with the first power-supply voltage and an input voltage. The protection circuit further includes a voltage limitation circuit is coupled between a first node applied with the input voltage and a second power-supply wire applied with a second power-supply voltage. The voltage limitation circuit includes a variable resistance unit having a resistance value that changes according to the control voltage. When the first power-supply voltage is not supplied to the protection circuit and the input voltage is larger than a first voltage, the control circuit generates the control voltage such that the resistance value of the variable resistance unit is smaller than that in a case where the input voltage is equal to or less than the first voltage.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which.

DESCRIPTION OF THE EMBODIMENTS

One embodiment will now be described below with reference to FIGS. 1A to 7.

Figure 1A:
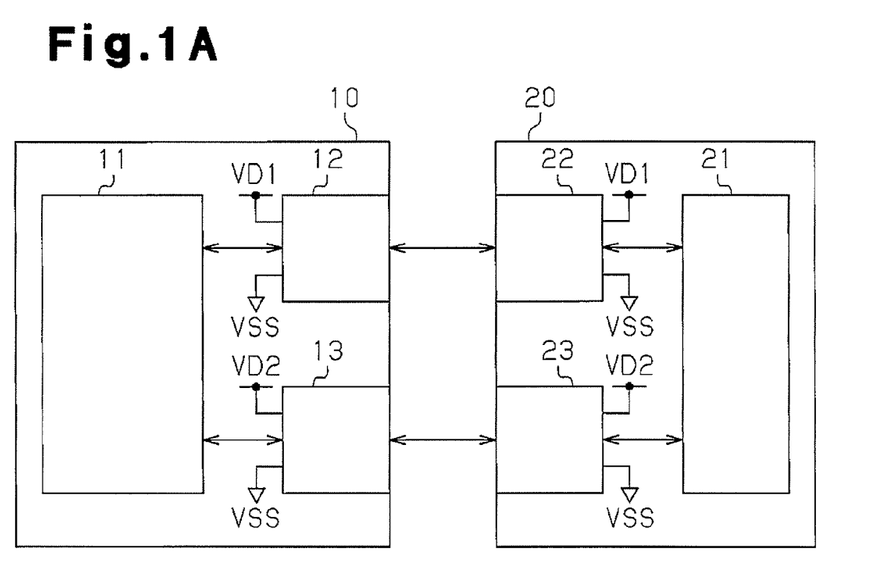
FIG. 1A illustrates a schematic block diagram of an electronic device system.

FIG. 1A illustrates a memory card 20 coupled to a host device 10. The host device 10 is, for example, a personal computer, a digital camera, or the like. The host device 10 includes a slot into which the memory card 20 may be inserted and external terminals arranged in the slot. When the memory card 20 is inserted into the slot, the external terminals of the host device 10 are electrically coupled to the external terminals of the memory card 20. The host device 10 is one example of a first communication device, and the memory card 20 is one example of a second communication device.

The host device 10 includes an internal circuit 11 and first and second interface circuits 12 and 13 for communication with the memory card 20. The internal circuit 11 is a CPU, for example. The memory card 20 includes an internal circuit 21 and first and second interface circuits 22 and 23 for communication with the host device 10. The internal circuit 21 includes a control circuit and a memory, for example. The memory is a non-volatile memory (e.g., an NAND-type non-volatile memory), for example. The interface circuits 22 and 23 in the memory card 20 communicate with the interface circuits 12 and 13 in the host device 10, respectively.

The first interface circuit 12 in the host device 10 and the first interface circuit 22 in the memory card 20 conduct communications according to given standards. Similarly, the second interface circuit 13 in the host device 10 and the second interface circuit 23 in the memory card 20 conduct communications according to given standards. The standards for the second interface circuits 13 and 23 have upward compatibility with respect to the standards for the first interface circuits 12 and 22. For example, the data transfer rate at the second interface circuits 13 and 23 is higher than the data transfer rate at the first interface circuits 12 and 22. When the host device 10 is coupled to the memory card 20 by means of the interface circuits 13 and 23, the internal circuit 11 in the host device 10 and the internal circuit 21 in the memory card 20 communicate with each other via the second interface circuits 13 and 23 with higher functions than those of the first interface circuits 12 and 22.

Figure 1B:
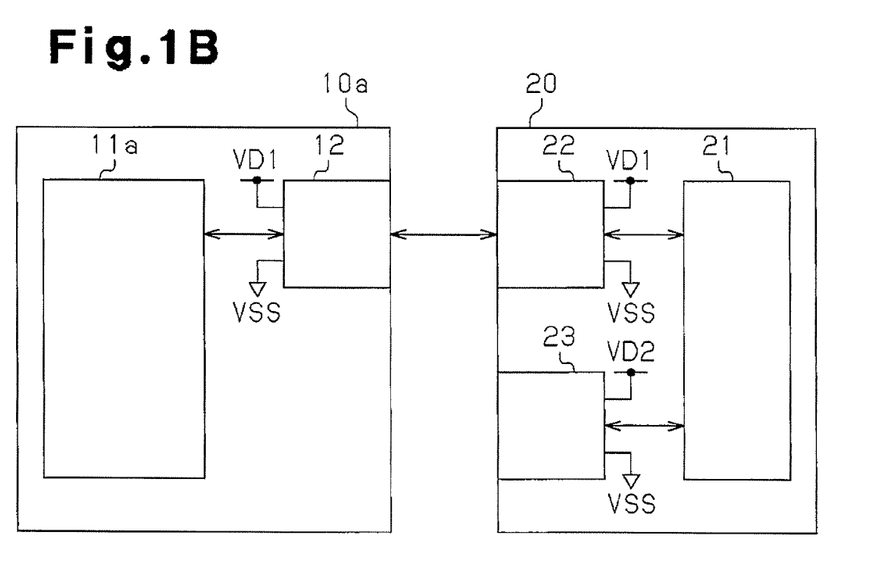
FIG. 1B illustrates a schematic block diagram of another electronic device system.

The memory card 20 illustrated in FIG. 1A may also be used in a host device not in conformity with the standards for the second interface circuit 23. For example, as illustrated in FIG. 1B, a host device 10a has the first interface circuit 12, but does not have the second interface circuit 13. In this case, the internal circuit 11a in the host device 10a and the internal circuit 21 in the memory card 20 communicate with each other via the first interface circuits 12 and 22.

As illustrated in FIG. 1A, the first interface circuit 12 in the host device 10 operates according to a power-supply voltage VD1 at a higher potential side and a power-supply voltage VSS at a lower potential side. The second interface circuit 13 operates according to a power-supply voltage VD2, which is lower than the power-supply voltage VD1, and the power-supply voltage VSS. The power-supply voltage VD2 is one example of a first power-supply voltage, and the power-supply voltage VSS is one example of a second power-supply voltage. For example, the voltage value of the power-supply voltage VD1 is 3.3 [V], and the voltage value of the power-supply voltage VD2 is 1.1 [V]. The power-supply voltage VSS is 0 [V], for example.

The first interface circuit 22 in the memory card 20 operates according to the power-supply voltage VD1, which is supplied from the first interface circuit 12 in the host device 10, and the power-supply voltage VSS. The second interface circuit 23 operates according to the power-supply voltage VD2 supplied from the second interface circuit 13 in the host device 10 and the power-supply voltage VSS. The internal circuit 21 in the memory card 20 operates according to a voltage generated on the basis of the power-supply voltages VD1 and VSS or a voltage generated on the basis of the power-supply voltages VD2 and VSS.

Each of the interface circuits 12, 13, 22, and 23 includes elements such as MOS transistors, for example. The MOS transistors included in the second interface circuits 13 and 23 are more suitable for high-speed communications than the MOS transistors included in the first interface circuits 12 and 22. For example, the MOS transistors in the second interface circuits 13 and 23 are low-voltage MOS transistors, and are activated and deactivated off under a gate voltage lower than that in the MOS transistors in the first interface circuits 12 and 22. These elements are formed by a fine process. Therefore, the MOS transistors in the second interface circuits 13 and 23 have gate oxide films thinner than those in the MOS transistors in the first interface circuits 12 and 22. Accordingly, the MOS transistors in the second interface circuits 13 and 23 are so-called low-voltage transistors (low-voltage elements) with voltage resistance lower than that of the MOS transistors in the first interface circuits 12 and 22.

Figure 2:
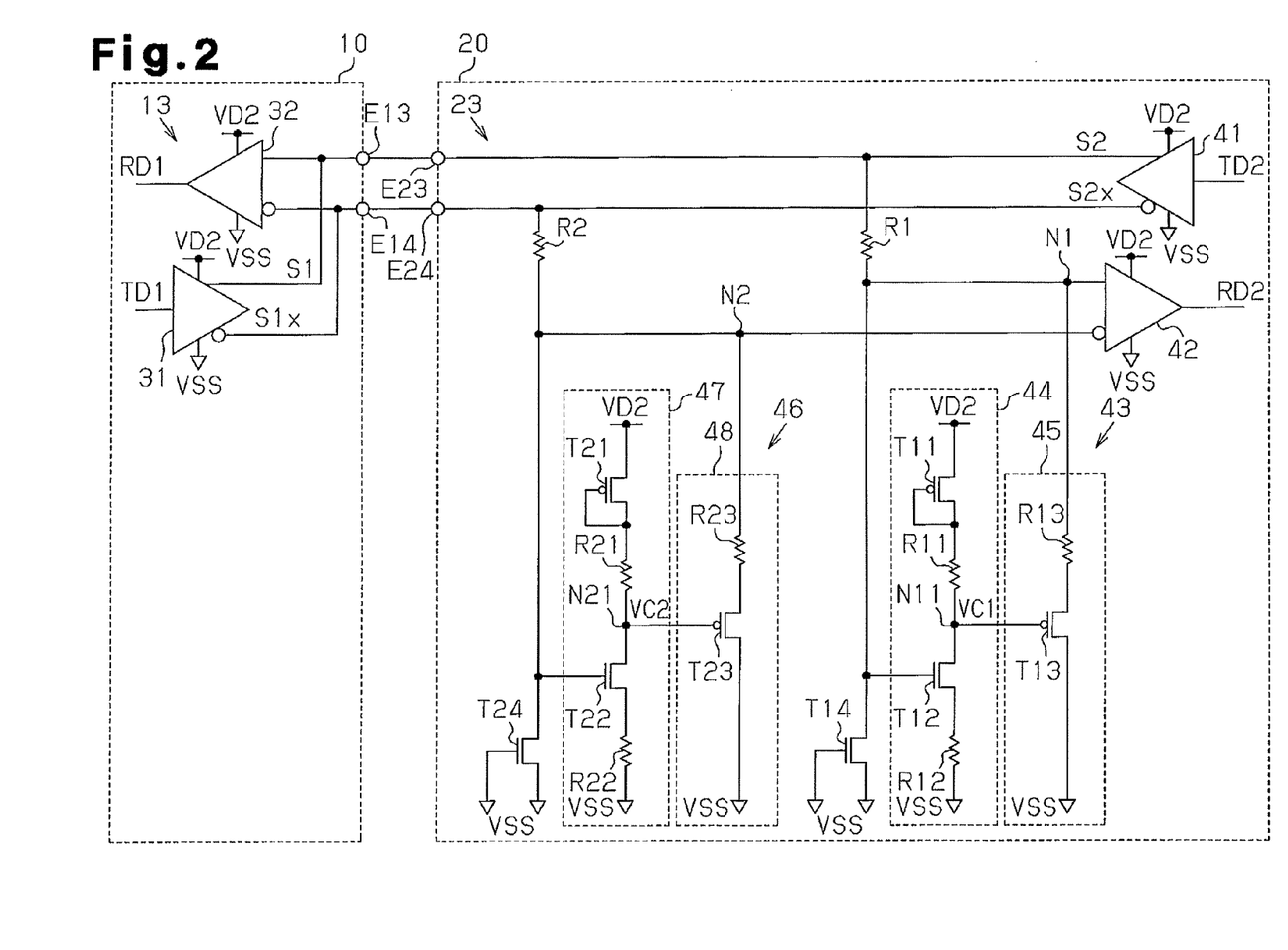
FIG. 2 illustrates a schematic circuit diagram of an input/output circuit.

As illustrated in FIG. 2, the second interface circuit 13 in the host device 10 includes a transmission circuit 31 and a reception circuit 32. FIG. 2 does not illustrate the internal circuit 11 and the first interface circuit 12 for easy understanding. The transmission circuit 31 includes a higher potential-side power-supply terminal coupled to a wire supplying the power-supply voltage VD2 (hereinafter, referred to as power-supply wire VD2) and a lower potential-side power-supply terminal coupled to a wire supplying the power-supply voltage VSS (hereinafter, referred to as power-supply wire VSS). Similarly, the reception circuit 32 includes a higher potential-side power-supply terminal coupled to the power-supply wire VD2 and a lower potential-side power-supply terminal coupled to the power-supply wire VSS.

The transmission circuit 31 receives a transmission signal TD1 from the internal circuit 11 illustrated in FIG. 1A. The transmission circuit 31 outputs differential signals according to the transmission signal TD1 to a non-inverted output terminal and an inverted output terminal. The non-inverted output terminal of the transmission circuit 31 is coupled to an external terminal E13 in the host device 10. The inverted output terminal of the transmission circuit 31 is coupled to an external terminal E14 in the host device 10. The external terminal E13 is coupled to a non-inverted input terminal of the reception circuit 32. The external terminal E14 is coupled to an inverted input terminal of the reception circuit 32. The reception circuit 32 outputs a reception signal RD1 according to differential signals supplied via the external terminals E13 and E14. The reception signal RD1 is supplied to the internal circuit 11 illustrated in FIG. 1A.

The external terminals E13 and E14 in the host device 10 are coupled to the external terminals E23 and E24 in the memory card 20, respectively. The second interface circuit 23 in the memory card 20 includes a transmission circuit 41, a reception circuit 42, protection circuits 43 and 46, and resistors R1 and R2. FIG. 2 does not illustrate the internal circuit 21 and the first interface circuit 22 for easy understanding.

In the memory card 20, the external terminal E23 is coupled to a first terminal of the resistor R1, and a second terminal of the resistor R1 is coupled to a non-inverted input terminal of the reception circuit 42. The external terminal E24 is coupled to a first terminal of the resistor R2, and a second terminal of the resistor R2 is coupled to an inverted input terminal in the reception circuit 42. The reception circuit 42 includes a higher potential-side power-supply terminal coupled to the power-supply wire VD2 and a lower potential-side power-supply terminal coupled to the power-supply wire VSS. The reception circuit 42 outputs a reception signal RD2 according to the differential signals supplied via the external terminals E23 and E24 and the resistors R1 and R2. The reception signal RD2 is supplied to the internal circuit 21 illustrated in FIG. 1A. The transmission circuit 41 receives the transmission signal TD2 from the internal circuit 21. A non-inverted output terminal of the transmission circuit 41 is coupled to the external terminal E23, and an inverted output terminal of the transmission circuit 41 is coupled to the external terminal E24. The transmission circuit 41 includes a higher potential-side power-supply terminal coupled to the power-supply wire VD2 and a lower potential-side power-supply terminal coupled to the power-supply wire VSS. The transmission circuit 41 outputs differential signals according to the transmission signal TD2.

One example of the transmission circuit 41 will now be described with reference to FIG. 3. The transmission circuit 41 includes a current source 51, transistors T31 and T32, and resistors R31 and R32. The transistors T31 and T32 are P-channel MOS transistors, for example. The P-channel MOS transistor is one example of a first conductive-type MOS transistor. An input signal DP is supplied to a gate terminal of the transistor T31, and an inverted input signal DM is supplied to a gate terminal of the transistor T32. The input signal DP and the inverted input signal DM are examples of the transmission signal TD2 illustrated in FIG. 2. A source terminal of the transistor T31 and a source terminal of the transistor T32 are coupled to each other. The current source 51 includes a first terminal coupled to the power-supply wire VD2 and a second terminal coupled to a coupling node between the source terminals of the transistors T31 and T32.

A drain terminal of the transistor T31 is coupled to a first terminal of the resistor R31, and a second terminal of the resistor R31 is coupled to the power-supply wire VSS. A drain terminal of transistor T32 is coupled to a first terminal of the resistor R32, and a second terminal of the resistor R32 is coupled to the power-supply wire VSS. An inverted output signal S2x is output from a node N31 between the drain terminal of the transistor T31 and the resistor R31. A non-inverted output signal S2 is output from a node N32 between the drain terminal of the transistor T32 and the resistor R32. The non-inverted output signal S2 and the inverted output signal S2x are examples of differential signals.

Figure 4:
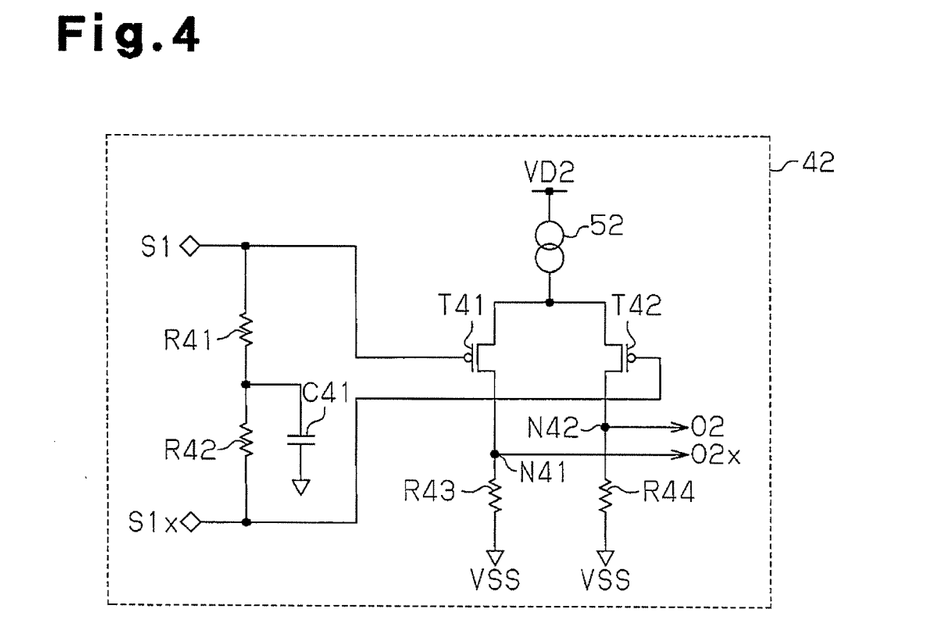
FIG. 4 illustrates a schematic circuit diagram of an input buffer.

One example of the reception circuit 42 will now be described with reference to FIG. 4. The reception circuit 42 includes a current source 52, transistors T41 and T42, resistors R41 to R44, and a capacitor C41. The transistors T41 and T42 are P-channel MOS transistors, for example.

The non-inverted input signal S1 is supplied to a gate terminal of the transistor T41 and a first terminal of the resistor R41. The inverted input signal S1x is supplied to a gate terminal of the transistor T42 and a first terminal of the resistor R42. The non-inverted input signal S1 and the inverted input signal S1x are examples of differential signals. A second terminal of the resistor R41 and a second terminal of the resistor R42 are coupled to each other. The capacitor C41 includes a first terminal coupled to a coupling node between the second terminals of the resistors R41 and R42 and a second terminal coupled to the power-supply wire VSS.

A source terminal of the transistor T41 and a source terminal of the transistor T42 are coupled to each other. The current source 52 includes a first terminal coupled to the power-supply wire VD2 and a second terminal coupled to a coupling node between the source terminals of the transistors T41 and T42. A drain terminal of the transistor T41 is coupled to a first terminal of the resistor R43, and a second terminal of the resistor R43 is coupled to the power-supply wire VSS. A drain terminal of the transistor T42 is coupled to a first terminal of the resistor R44, and a second terminal of the resistor R44 is coupled to the power-supply wire VSS. An inverted output signal O2x is output from a node N41 between the drain terminal of the transistor T41 and the resistor R43, and a non-inverted output signal O2 is output from a node N42 between the drain terminal of the transistor T42 and the resistor R44. The non-inverted output signal O2 and the inverted output signal O2x are examples of the reception signal RD2.

Figure 3:
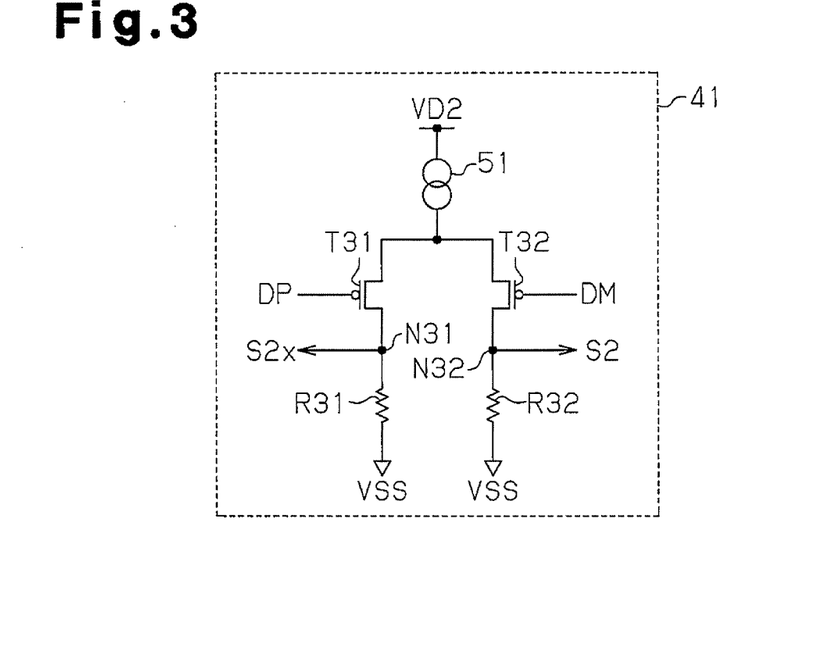
FIG. 3 illustrates a schematic circuit diagram of an output buffer.

The transmission circuit 31 of the second interface circuit 13 in the host device 10 (refer to FIG. 2) is configured in the same manner as the transmission circuit 41 illustrated in FIG. 3. Further, the reception circuit 32 (refer to FIG. 2) is configured in the same manner as the reception circuit 42 illustrated in FIG. 4.

As illustrated in FIG. 2, the first protection circuit 43 includes a control circuit 44, a voltage limitation circuit 45, and a transistor T14. The control circuit 44 includes transistors T11 and T12 and resistors R11 and R12. The transistor T11 is a P-channel MOS transistor, and the transistor T12 is an N-channel MOS transistor. The N-channel MOS transistor is one example of a second conductive-type MOS transistor.

The transistor T11 includes a source terminal, which is coupled to the power-supply wire VD2, and a gate terminal and a drain terminal coupled to each other. That is, the transistor T11 is a so-called diode-coupled transistor. The drain terminal of the transistor T11 is coupled to a first terminal of the resistor R11, and a second terminal of the resistor R11 is coupled to a drain terminal of the transistor T12. A source terminal of the transistor T12 is coupled to a first terminal of the resistor R12, and a second terminal of the resistor R12 is coupled to the power-supply wire VSS. A gate terminal of the transistor T12 is coupled to the second terminal of the resistor R1 and the non-inverted input terminal of the reception circuit 42. A first control voltage VC1 output to a node N11 between the resistor R11 and the transistor T12 is supplied to the voltage limitation circuit 45.

The voltage limitation circuit 45 includes a transistor T13 and a resistor R13. The transistor T13 is a P-channel MOS transistor. The resistor R13 has a first terminal, which is coupled to the second terminal of the resistor R1 and the non-inverted input terminal of the reception circuit 42, and a second terminal coupled to a source terminal of the transistor T13. A drain terminal of the transistor T13 is coupled to the power-supply wire VSS. The first control voltage VC1 generated by the control circuit 44 is supplied to a gate terminal of the transistor T13.

The transistor T14 is an N-channel MOS transistor, for example. The transistor T14 includes a source terminal and a drain terminal, each of which is coupled to the power-supply wire VSS, and a drain terminal, which is coupled to the second terminal of the resistor R1.

The second protection circuit 46 is configured in the same manner as the first protection circuit 43. That is, the second protection circuit 46 includes a control circuit 47, a voltage limitation circuit 48, and a transistor T24. The control circuit 47 includes transistors T21 and T22, and resistors R21 and R22. The transistor T21 is a P-channel MOS transistor, and the transistor T22 is an N-channel MOS transistor. A gate terminal of the transistor T22 is coupled to the second terminal of the resistor R2 and the inverted input terminal of the reception circuit 42. A second control voltage VC2 output to a node N21 between the resistor R21 and the transistor T22 is supplied to the voltage limitation circuit 48.

The voltage limitation circuit 48 includes a transistor T23 and a resistor R23. The transistor T23 is a P-channel MOS transistor. The second control voltage VC2 is supplied to a gate terminal of the transistor T23. A first terminal of the resistor R23 is coupled to the second terminal of the resistor R2 and the inverted input terminal of the reception circuit 42. The transistor T24 is an N-channel MOS transistor. A drain terminal of the transistor T24 is coupled to the second terminal of the resistor R2.

Next, operations of the interface circuits 13 and 23 will now be described.

Figure 6:
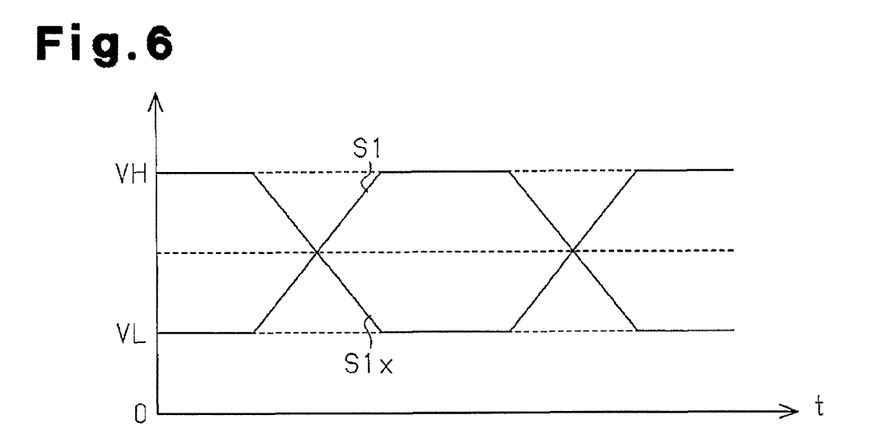
FIG. 6 is a schematic waveform diagram illustrating operations of the input/output circuit.

In the host device 10, as illustrated in FIG. 2, the transmission circuit 31 in the interface circuit 13 outputs differential signals S1 and S1x illustrated in FIG. 6 in accordance with the transmission signal TD1 supplied from the internal circuit 11 illustrated in FIG. 1A. Maximum voltage VH of the differential signals S1 and S1x is 300 [mV], for example, and minimum voltage VL of the differential signals S1 and S1x is 100 [mV], for example.

The differential signals S1 and S1x are transmitted from the host device 10 to the memory card 20. In the memory card 20, the reception circuit 42 in the interface circuit 23 outputs the reception signal RD2 according to the differential signals S1 and S1x. The reception signal RD2 is supplied to the internal circuit 21 illustrated in FIG. 1A.

The transmission circuit 41 of the interface circuit 23 outputs the differential signals S2 and S2x according to the transmission signal TD2 supplied from the internal circuit 21 illustrated in FIG. 1A. Waveform and amplitude of the differential signals S2 and S2x are similar to those of the differential signals S1 and S1x. The differential signals S2 and S2x are transmitted from the memory card 20 to the host device 10. In the host device 10, the reception circuit 32 of the second interface circuit 13 outputs the reception signal RD1 according to the differential signals S2 and S2x. The reception signal RD1 is supplied to the internal circuit 11 illustrated in FIG. 1A.

In the protection circuit 43, the gate terminal and source terminal of the transistor T14 are coupled to the power-supply wire VSS. Therefore, the transistor T14 operates in a weak inversion region to hold the voltage in the gate terminal of the transistor T12 (gate voltage) in the control circuit 44 at the level of the power-supply voltage VSS. The transistor T12 is deactivated by the gate voltage at the level of the power-supply voltage VSS. In the control circuit 44, since the gate terminal and drain terminal of the transistor T11 are coupled to each other, the transistor T11 functions as a low-impedance element. Accordingly, the voltage at the node N11 between the drain terminal of the transistor T12 and the resistor R11 is set at the level of the power-supply voltage VD2. Thus, the control circuit 44 outputs the first control voltage VC1 at the level of the power-supply voltage VD2.

In the voltage limitation circuit 45, the source terminal of the transistor T13 is coupled via the resistor R13 to the non-inverted input terminal of the reception circuit 42. Therefore, the source voltage of the transistor T13 corresponds to the level of the input signal S1. The first control voltage VC1 at the level of the power-supply voltage VD2 is supplied to the gate terminal of the transistor T13. Thus, the transistor T13 is deactivated by the first control voltage VC1.

In the control circuit 44, the source terminal of the transistor T12 is coupled to the power-supply wire VSS via the resistor R12. The transistor T12 and the resistor R12 function as a source degeneration circuit. The gate terminal of the transistor T12 is coupled to the second terminal of the resistor R1 and the non-inverted input terminal of the reception circuit 42. Therefore, a voltage corresponding to the level of the input signal S1, which is applied to the reception circuit 42, is applied as a gate voltage to the gate terminal of the transistor T12. As illustrated in FIG. 6, the input signal S1 changes in amplitude between the voltage VH and the voltage VL. The voltage VH is lower than a threshold voltage of the transistor T12. Therefore, when the input signal S1 is applied to the gate terminal of the transistor T12, the transistor T12 is not activated.

Figure 5:
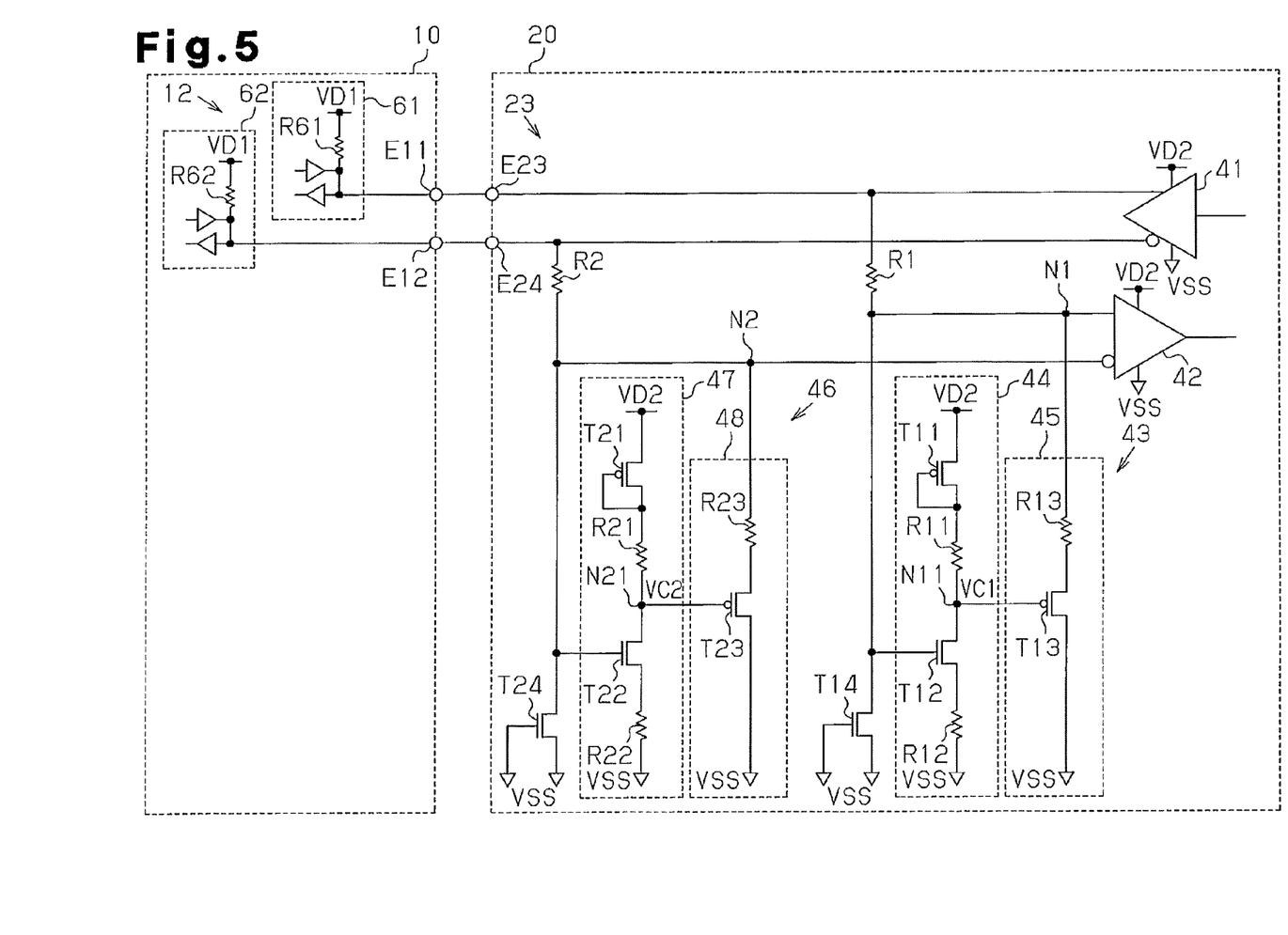
FIG. 5 is a schematic circuit diagram illustrating operations of the input/output circuit.

As illustrated in FIG. 5, the external terminals E23 and E24 of the memory card 20 may be coupled to the external terminals E11 and E12 of the host device 10. The external terminals E11 and E12 are used to couple the first interface circuit 22 of the memory card 20 (refer to FIG. 1A) to the first interface circuit 12 of the host device 10.

The interface circuit 12 includes an input/output circuit 61 coupled to the external terminal E11 and an input/output circuit 62 coupled to the external terminal E12. The input/output circuit 61 includes a resistor R61 that pulls up the external terminal E11 to the power-supply voltage VD1. Thus, when the external terminal E23 is coupled to the external terminal E11, the external terminal E23 is coupled to the power-supply voltage VD1 via the resistor R61. In this case, as illustrated in FIG. 7, the voltage V (E23) at the external terminal E23 rises from a given potential in accordance with a value of a parasitic capacity at the external terminal E23 and a wire coupled to the external terminal E23 and a time constant determined by a resistance value of the resistor R61.

When the second interface circuit 23 of the memory card 20 is not coupled to the second interface circuit 12 of the host device 10, that is, when the external terminal E23 of the memory card 20 is in a non-coupled state, the potential at the external terminal E23 is at the level equal to the power-supply wire VSS (that is, 0 [V]) due to a leak current via the MOS transistor or the like in the second interface circuit 23. Thus, when the external terminal E23 is coupled to the external terminal E11, the voltage V (E23) at the external terminal E23 rises from 0 [V]. Similarly, the gate voltage of the transistor T12 in the control circuit 44 rises from 0 [V] according to the rise of the voltage V at the external terminal E23. When the gate voltage of the transistor T12 reaches a given voltage, the transistor T12 is activated. Accordingly, the control voltage VC1 is set at the level of the power-supply voltage VSS. The control voltage VC1 is supplied to the gate terminal of the transistor T13 in the voltage limitation circuit 45. The gate voltage applied to the gate terminal of the transistor T12 according to the voltage V (E23) at the external terminal E23 is one example of an input voltage supplied to the control circuit 44.

The source terminal of the transistor T13 (P-channel MOS transistor) is coupled to the node N1 between the resistor R1 and the non-inverted input terminal of the reception circuit 42 via the resistor R13. Since the transistor T13 is activated by the control voltage VC1 having the level of the power-supply voltage VSS, the on resistance value of the transistor T13 is small. The transistor T13 is one example of a variable resistance unit with a resistance value changing according to the control voltage VC1. When the transistor T13 is activated, the node N1 is electrically coupled to the power-supply wire VSS via the activated transistor T13 (on resistor) and the resistor R13. In this state, the voltage V (E23) at the external terminal E23 is obtained in such a manner that a potential difference between the power-supply voltage VD1 and the power-supply voltage VSS is divided at a resistance ratio between the resistor R61 and the resistor group (the resistors R1 and R13 and the on resistor of the transistor T13). The voltage V (N1) at the node N1 is obtained in such a manner that a potential difference between the power-supply voltage VD1 and the power-supply voltage VSS is divided by a resistance ratio between the resistor group (the resistors R61 and R1) and the resistor group (the resistor R13 and the on resistor of the transistor T13).

Figure 7:
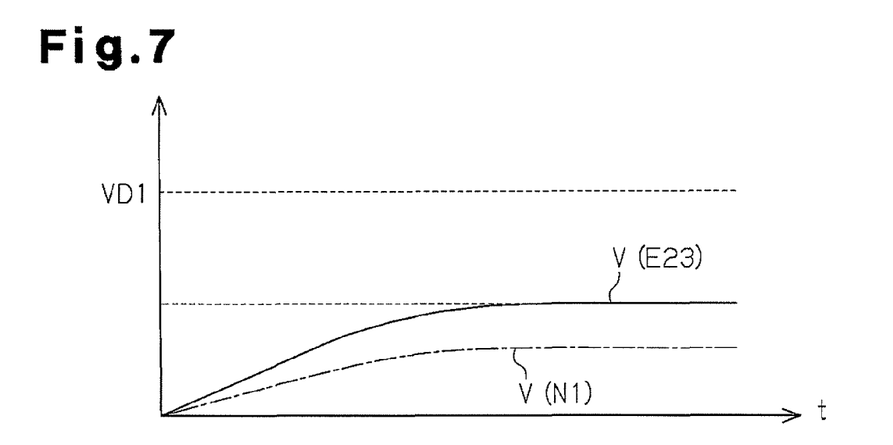
FIG. 7 is a schematic waveform diagram illustrating operations of the input/output circuit.

Therefore, as illustrated in FIG. 7, the voltage V (E23) at the external terminal E23 is limited to a voltage value lower than the power-supply voltage VD1. The voltage V (N1) at the node N1 is limited to a value lower than the voltage V (E23) at the external terminal E23. The resistance values of the resistors R1 and R13 are set such that the voltage V (E23) at the external terminal E23 becomes lower than a voltage resistance of the transistor T32 in the transmission circuit 41 (refer to FIG. 3) and the voltage V (N1) at the node N1 becomes lower than a voltage resistance of the transistor T41 in the reception circuit 42 (refer to FIG. 4).

Similarly, the input/output circuit 62 includes a resistor R62 that pulls up the external terminal E12 to the power-supply voltage VD1. Thus, when the external terminal E24 is coupled to the external terminal E12, the external terminal E24 is coupled to the power-supply voltage VD1 via the resistor R62. The second protection circuit 46 configured in the same manner as the first protection circuit 43 controls the voltage at the external terminal E24 and controls the voltage at the node N2 between the resistor R2 and the inverted input terminal of the reception circuit 42. The voltage at the external terminal E24 is obtained in such a manner that a potential difference between the power-supply voltage VD1 and the power-supply voltage VSS is divided at a resistance ratio between the resistor R62 and the resistor group (the resistors R2 and R23 and the on resistor of the transistor T23). The voltage at the node N2 is obtained in such a manner that a potential difference between the power-supply voltage VD1 and the power-supply voltage VSS is divided at a resistance ratio between the resistor group (the resistor R62 and R2) and the resistor group (the resistor R2 and the on resistor of the transistor T23).

Therefore, the voltage at the external terminal E24 is limited to a voltage value lower than the power-supply voltage VD1. The voltage at the node N2 is limited to a voltage lower than the voltage at the external terminal E24. The resistance values of the resistors R2 and R23 are set such that the voltage at the external terminal E24 becomes lower than a voltage resistance of the transistor T31 (refer to FIG. 3) in the transmission circuit 41 and the voltage at the node N2 becomes lower than a voltage resistance of the transistor T42 (refer to FIG. 4) in the reception circuit 42.

Accordingly, it is also possible to prevent the transistors included in the second interface circuit 23 from being broken due to the power-supply voltage VD1 when the external terminals E23 and E24 corresponding to the second interface circuit 23 are coupled to the external terminals E11 and E12 corresponding to the first interface circuit 12.

As described above, in the control circuit 44, the transistor T12 and the resistor R12 coupled to the source terminal of the transistor T12 function as a source degeneration circuit. The source degeneration circuit changes linearly the drain voltage of the transistor T12. Thus, the control circuit 44 generates the control voltage VC1 that changes linearly according to changes in the voltage of the external terminal E23. Accordingly, the gate voltage of the transistor T13 in the voltage limitation circuit 45 is controlled linearly by the control voltage VC1. Similarly, in the voltage limitation circuit 45, the transistor T13 and the resistor R13 coupled to the source terminal in the transistor T13 function as a source degeneration circuit that changes linearly the voltage V (N1) at the node N1. Thus, the first protection circuit 43 linearly controls the voltage V (N1) at the node N1 according to changes in voltage of the external terminal E23.

Next, operations of the protection circuit 43 without the power-supply voltage VD2 supplied to the interface circuit 23 will now be described. In the following description, operations of the protection circuit 44 are the same as those of the protection circuit 43 and thus are omitted. When the external terminals E23 and E24 in the memory card 20 are coupled to the external terminals E11 and E12 in the host device 10 and the power-supply voltage VD2 is not supplied to the interface circuit 23, the transistor T12 in the control circuit 44 is activated according to rise in an input voltage applied to the gate terminal of the transistor T12 based on the voltage V (E23) at the external terminal E23. That is, when the input voltage of the control circuit 44 exceeds a threshold voltage of the transistor T12, the transistor T12 is activated. As a result, current flows through the transistor T12 from the node N11, that is, the gate terminal of the transistor T13 toward the power-supply wire VSS. The source degeneration circuit (T12 and R12) changes linearly the current flowing through the transistor T12 with respect to rise in the gate voltage (input voltage) of the transistor T12. The transistor T13 of the voltage limitation circuit 45 is activated according to drop in the gate voltage of the transistor T13 (that is, the control voltage VC1 generated at the node N11). Therefore, in the same manner as the above-described case where the power-supply voltage VD2 is supplied, the voltage limitation circuit 45 limits the voltage V (N1) at the node N1 to a divided voltage set by the resistance ratio between the resistor group (the resistors R61 and R1) and the resistor group (the resistor R13 and the on resistor of the transistor T13). In this manner, when the power-supply voltage VD2 is not supplied to the protection circuit 43 (that is, the interface circuit 23) and the input voltage of the control circuit 44 is larger than a given voltage, the control circuit 44 generates the control voltage VC1 such that the resistance value of the transistor T13 (one example of a variable resistance unit) is smaller than that in the case where the input voltage is equal to or less than the given voltage.

Figure 8:
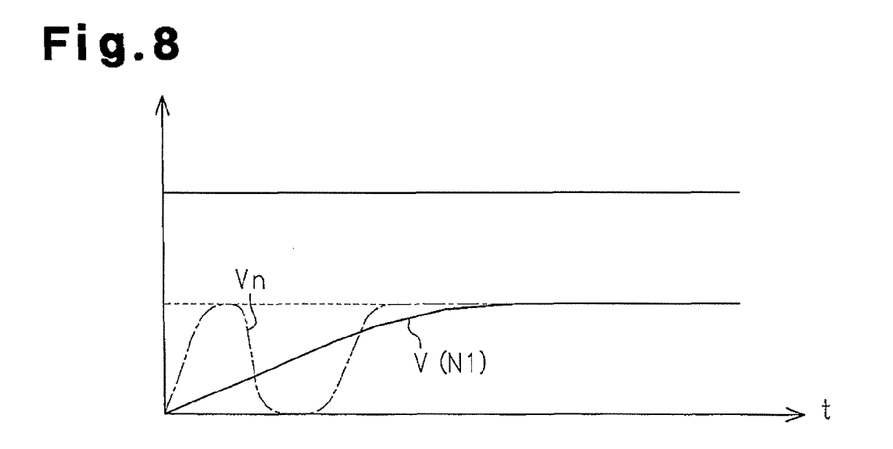
FIG. 8 is a schematic waveform diagram illustrating operations of the input/output circuit.

As one method for limiting the voltage at the node N1, an N-channel MOS transistor may be coupled between the power-supply wire VSS and the node N1 illustrated in FIG. 5. In this case, the voltage Vn at the node N1 in the circuit using the N-channel MOS transistor changes as illustrated by in FIG. 8 (see dashed-line). In contrast, the voltage V (N1) at the node N1 in the present embodiment changes linearly from time T0 as illustrated in FIG. 8 (see solid line). The time T0 refers to a time at which the power-supply voltage VD1 is applied, that is, the external terminals E23 and E24 of the memory card 20 contact the external terminals E11 and E12 of the host device 10 as illustrated in FIG. 5.

As another method for limiting the input voltage, a shunt circuit may be provided outside of the memory card 20. The shunt circuit includes a resistor and a switch which are coupled in serial between the external terminal E23 and a reference terminal (e.g., a wire having the level of the power-supply voltage VSS). However, this method requires a large-sized element. Further, using this method increases the parasitic capacity in signal transfer paths between the transmission circuits 31 and 41 and the reception circuits 42 and 32. This interferes with high-speed communications. In contrast, in the present embodiment, the interface circuit 23 of the memory card 20 includes the resistors and the like. Therefore, the increase of the parasitic capacity noted above is suppressed. This does not interfere with high-speed communications. Further, since the parasitic capacity is suppressed, it is possible to meet the requirements for return-loss during communications.

The present embodiment has the following advantages:

(1) The protection circuit 43 includes the control circuit 44 and the voltage limitation circuit 45. The control circuit 44 includes the transistor T11, the resistor R11, the transistor T12, and the resistor R12 which are coupled between the power-supply wire VD2 and the power-supply wire VSS. The power-supply voltage VD2 is supplied to the protection circuit 43. When the external terminals E23 and E24 are coupled to the external terminals E13 and E14 in the host device 10 for normal communications, the control circuit 44 generates the control voltage VC1 (refer to FIG. 2) having the level according to the power-supply voltage VD2. The voltage limitation circuit 45 includes the resistor R13 and the transistor T13 which are coupled between the node N1 and the power-supply wire VSS. The transistor T13 is deactivated by the control voltage VC1 supplied to the gate terminal.

When the external terminals E23 and E24 are coupled to the external terminals E11 and E12 in the host device 10, the voltage V (E23) at the external terminal E23 is applied to the gate terminal of the transistor T12 in the control circuit 44 based on the power-supply voltage VD1 higher than the power-supply voltage VD2 (refer to FIG. 5). When the transistor T12 is activated by the voltage V (E23), the control voltage VC1 is lowered to the level of the power-supply wire VSS. The control voltage VC1 activates the transistor T13. Accordingly, the voltage limitation circuit 45 limits the voltage at the node N1 to a voltage according to the resistance value of the resistor R13 and the on resistance value of the transistor T13. As a result, the voltage at the node N1 is limited so as to be equal to or lower than the voltage resistance of the transistors included in the transmission circuit 41 and the reception circuit 42. This prevents breakage of the transistors.

When the power-supply voltage VD2 is not supplied to the protection circuit 43, the transistor T12 in the control circuit 44 is activated according to the voltage V (E23) supplied to the external terminal E23 based on the power-supply voltage VD1. Accordingly, the voltage at the gate terminal of the transistor T13, which was in a floating state, is lowered to the level of the power-supply wire VSS. As a result, the transistor T13 is activated and the voltage limitation circuit 45 limits the voltage at the node N1 to a voltage according to the resistance value of the resistor R13 and the on resistance value of the transistor T13. Thus, the voltage at the node N1 is limited so as to be equal to or lower than the voltage resistance of the transistors included in the transmission circuit 41 and the reception circuit 42. This prevents breakage of the transistors.

(2) When the power-supply voltage VD2 is supplied to the protection circuit 43, the control circuit 44 sets the control voltage VC1 to the level of the power-supply voltage VD2 by the load including the transistor T11 that is diode-coupled and the resistor R11. This stabilizes the gate voltage of the transistor T13, which makes it possible to prevent malfunction of the transistor T13.

It should be apparent to those skilled in the art that the above embodiment may be embodied in many other specific forms without departing from the scope of the invention. Particularly, it should be understood that the above embodiment may be embodied in the following forms.

Figure 9:
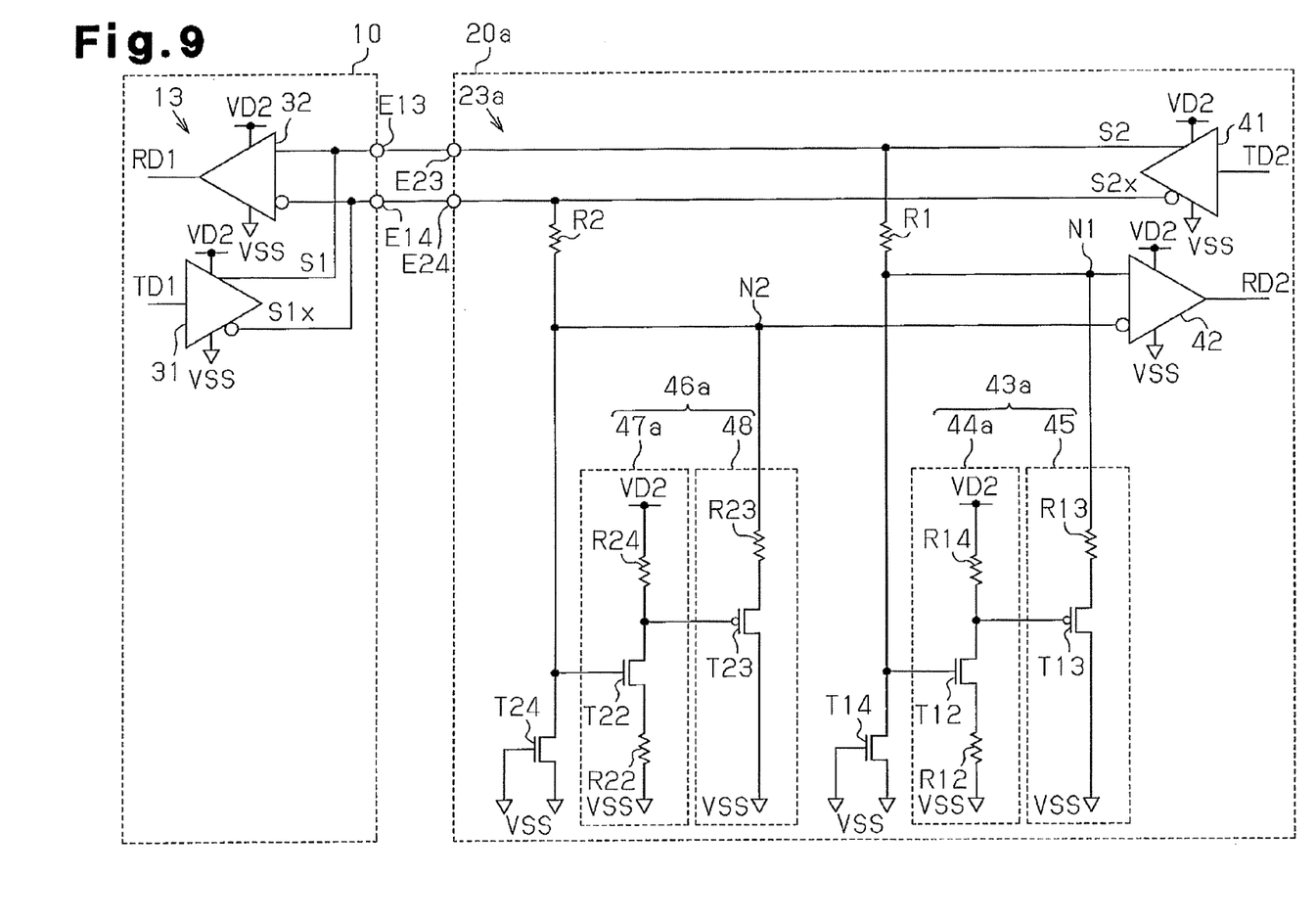
FIG. 9 illustrates a schematic circuit diagram of the input/output circuit.

The configurations of the protection circuits 43 and 46 may be changed as appropriate. For example, as illustrated in FIG. 9, an interface circuit 23a arranged in a memory card 20a includes a first protection circuit 43a and a second protection circuit 46a.

The first protection circuit 43a includes a control circuit 44a, a voltage limitation circuit 45, and a transistor T14. The control circuit 44a includes a transistor T12 and resistors R12 and R14. A source terminal of the transistor T12 is coupled to the power-supply wire VSS via the resistor R12. A drain terminal of the transistor T12 is coupled to the power-supply wire VD2 via the resistor R14. Similarly, the second protection circuit 46a includes a control circuit 47a, a voltage limitation circuit 48, and a transistor T24. The control circuit 47a includes a transistor T22 and resistors R22 and R24. A source terminal of the transistor T22 is coupled to the power-supply wire VSS via the resistor R22. A drain terminal of the transistor T22 is coupled to the power-supply wire VD2 via the resistor R24. The protection circuits 43a and 46a limit the voltages at the nodes N1 and N2, respectively, in the same manner as the above embodiment.

In the protection circuits 43 and 46 illustrated in FIG. 2, the resistors R11 and R21 may be omitted. In addition, in the protection circuit 43, the resistor R11 and the transistor T11 may be replaced with diodes. Similarly, in the protection circuit 46, the resistor R21 and the transistor T21 may be replaced with diodes.

In the protection circuits 43 and 46 illustrated in FIG. 2, the transistors T14 and T24 may be omitted.

In the above embodiment, the protection circuits 43 and 46 are applied to the memory card 20 coupled to the host device 10. Alternatively, the protection circuits in the above embodiment may be applied to interface circuits in two communication devices that are coupled to each other by a cable to conduct transmission and reception.

In the above embodiment, the interface circuit 23 includes the transmission circuit 41 and the reception circuit 42. Alternatively, the interface circuit 23 may include one of the transmission circuit and the reception circuit.

In the above embodiment, the resistors R1 and R2 illustrated in FIG. 2 may be omitted.

The voltage settings in the interface circuits may be changed as appropriate. For example, the voltage range of the differential signal may be changed. For example, in the interface circuit that operate according to a higher potential-side power-supply voltage of 3.3 [V] and a lower potential-side power-supply voltage of 2.2 [V], when a voltage having the level of the power-supply voltage VSS (e.g., 0 [V]) is supplied to the interface circuit via external terminals, a potential difference between the signal level for communication and the voltage applied to the interface circuit may exceed a voltage resistance in an element (MOS transistor) included in at least one of the transmission circuit and the reception circuit. The protection circuits in the above embodiment may be used to protect such an interface circuit (the transmission circuit and the reception circuit). In this case, the transistor included in the voltage limitation circuit may be set as an N-channel MOS transistor, and the transistor included in the control circuit may be set as a P-channel MOS transistor.

In the above embodiment, the host device 10 and the memory card 20 coupled to the external terminal in the host device 10 are described. Instead, in two semiconductor devices mounted on a printed board, at least one of two interface circuits communicating with each other via wires formed on the printed board may include the protection circuits according to the above embodiment.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments of the present invention have been described in detail, it should be understood that various changes, substitutions, and alterations could be made hereto without departing from the spirit and scope of the invention.

The invention claimed is:

1. A protection circuit comprising:
   a control circuit coupled to a first power-supply wire applied with a first power-supply voltage, wherein the control circuit generates a control voltage in accordance with the first power-supply voltage and an input voltage; and
   a voltage limitation circuit coupled between a first node applied with the input voltage and a second power-supply wire applied with a second power-supply voltage, wherein the voltage limitation circuit includes a variable resistance unit having a resistance value that changes according to the control voltage,
   wherein when the first power-supply voltage is not supplied to the protection circuit and the input voltage is larger than a first voltage, the control circuit generates the control voltage such that the resistance value of the variable resistance unit is smaller than that in a case where the input voltage is equal to or less than the first voltage.

2. The protection circuit according to claim 1, wherein:
   the voltage limitation circuit further includes a first resistor, the first resistor including a first terminal coupled to the first node and a second terminal, and
   the variable resistance unit includes a first conductive-type MOS transistor, the first conductive-type MOS transistor including a drain terminal coupled to the second power-supply wire, a source terminal coupled to the second terminal of the first resistor, and a gate terminal supplied with the control voltage.

3. The protection circuit according to claim 2, wherein the control circuit includes:
   a second resistor including a first terminal coupled to the second power-supply wire and a second terminal, and
   a second conductive-type MOS transistor having a conductive-type different from that of the first conductive-type MOS transistor, the second conductive-type MOS transistor including a source terminal coupled to the second terminal of the second resistor, a drain terminal coupled to the gate terminal of the first conductive-type MOS transistor, and a gate terminal supplied with the input voltage.

4. The protection circuit according to claim 3, wherein the control circuit includes a load coupled between the drain terminal of the second conductive-type MOS transistor and the first power-supply wire.

5. The protection circuit according to claim 1, wherein:
   the control circuit includes:
      a first resistor coupled to the second power-supply wire,
      an NMOS transistor including a gate terminal applied with the input voltage, a source terminal coupled to the first resistor, and a drain terminal, and
      a load coupled between the drain terminal of the NMOS transistor and the first power-supply wire, and
   the voltage limitation circuit includes:
      a PMOS transistor including a gate terminal coupled to a second node between the drain terminal of the NMOS transistor and the load, a drain terminal coupled to the second power-supply wire, and a source terminal, and
      a second resistor coupled between the source terminal of the PMOS transistor and the first node.

6. An interface circuit comprising:
   at least one of a transmission circuit capable of outputting a signal to an external terminal and a reception circuit capable of receiving a signal from the external terminal; and
   a protection circuit coupled to the external terminal, wherein the protection circuit includes:
      a control circuit coupled to a first power-supply wire applied with a first power-supply voltage, wherein the control circuit generates a control voltage in accordance with the first power-supply voltage and an input voltage, and
      a voltage limitation circuit coupled between a node applied with the input voltage and a second power-supply wire applied with a second power-supply voltage, wherein the voltage limitation circuit includes a variable resistance unit having a resistance value that changes according to the control voltage, and
      wherein when the first power-supply voltage is not supplied to the protection circuit and the input voltage is larger than a first voltage, the control circuit generates the control voltage such that the resistance value of the variable resistance unit is smaller than that in a case where the input voltage is equal to or less than the first voltage.

7. A communication system comprising:
   a first communication device; and
   a second communication device that is capable of communicating with the first communication device, wherein:
   the first communication device includes a first external terminal and a first interface circuit coupled to the first external terminal,
   the first interface circuit includes a resistor that pulls up the first external terminal to a first power-supply voltage,
   the second communication device includes a second external terminal and a second interface circuit coupled to the second external terminal,
   the second interface circuit is capable of being coupled to the first interface circuit via the first and second external terminals and is capable of operating under a second power-supply voltage lower than the first power-supply voltage,
   the second interface circuit includes a protection circuit coupled to the second external terminal, and
   the protection circuit includes:
      a control circuit coupled to a first power-supply wire applied with the second power-supply voltage, wherein the control circuit generates a control voltage in accordance with the second power-supply voltage and an input voltage supplied via the second external terminal, and
      a voltage limitation circuit coupled between a node applied with the input voltage and a second power-supply wire applied with a third power-supply voltage, wherein the voltage limitation circuit includes a variable resistance unit having a resistance value that changes according to the control voltage,
      wherein when the second power-supply voltage is not supplied to the protection circuit and the input voltage is larger than a first voltage, the control circuit generates the control voltage such that the resistance value of the variable resistance unit is smaller than that in a case where the input voltage is equal to or less than the first voltage.

* * * * *